United States Patent
Park

(10) Patent No.: US 9,823,792 B2
(45) Date of Patent: Nov. 21, 2017

(54) TOUCH PANEL

(71) Applicant: LG INNOTEK CO., LTD., Seoul (KR)

(72) Inventor: Hun Bae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 92 days.

(21) Appl. No.: 14/572,103

(22) Filed: Dec. 16, 2014

(65) Prior Publication Data

US 2015/0169109 A1    Jun. 18, 2015

(30) Foreign Application Priority Data

Dec. 16, 2013  (KR) .................. 10-2013-0156718

(51) Int. Cl.
G06F 3/045    (2006.01)
G06F 3/044    (2006.01)

(52) U.S. Cl.
CPC .... *G06F 3/044* (2013.01); *G06F 2203/04107* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 2011/0261003 A1 | 10/2011 | Lee et al. | 345/174 |
| 2011/0291987 A1* | 12/2011 | Wang | G06F 3/044 345/174 |
| 2012/0127094 A1 | 5/2012 | Jeong | 345/173 |
| 2012/0154725 A1* | 6/2012 | Jeon | G02F 1/13338 349/110 |
| 2012/0306776 A1* | 12/2012 | Kim | G06F 3/044 345/173 |
| 2013/0271675 A1* | 10/2013 | Misaki | G06F 3/044 349/12 |
| 2015/0253809 A1* | 9/2015 | Hata | G06F 3/044 345/173 |

FOREIGN PATENT DOCUMENTS

| | | |
|---|---|---|
| KR | 10-2011-0041109 A | 4/2011 |
| KR | 10-2011-0117522 A | 10/2011 |
| KR | 10-2011-0132761 A | 12/2011 |
| KR | 10-2012-0053855 A | 5/2012 |

* cited by examiner

*Primary Examiner* — Jonathan Boyd
*Assistant Examiner* — Stephen T Reed
(74) *Attorney, Agent, or Firm* — KED & Associates, LLP

(57) ABSTRACT

A touch panel includes a cover substrate including an active area and an unactive area; a printing layer on the unactive area; a conductive layer on the printing layer; an insulating layer on the printing layer; and a wire electrode insulated from the conductive layer by the insulating layer.

18 Claims, 13 Drawing Sheets

[FIG. 1]
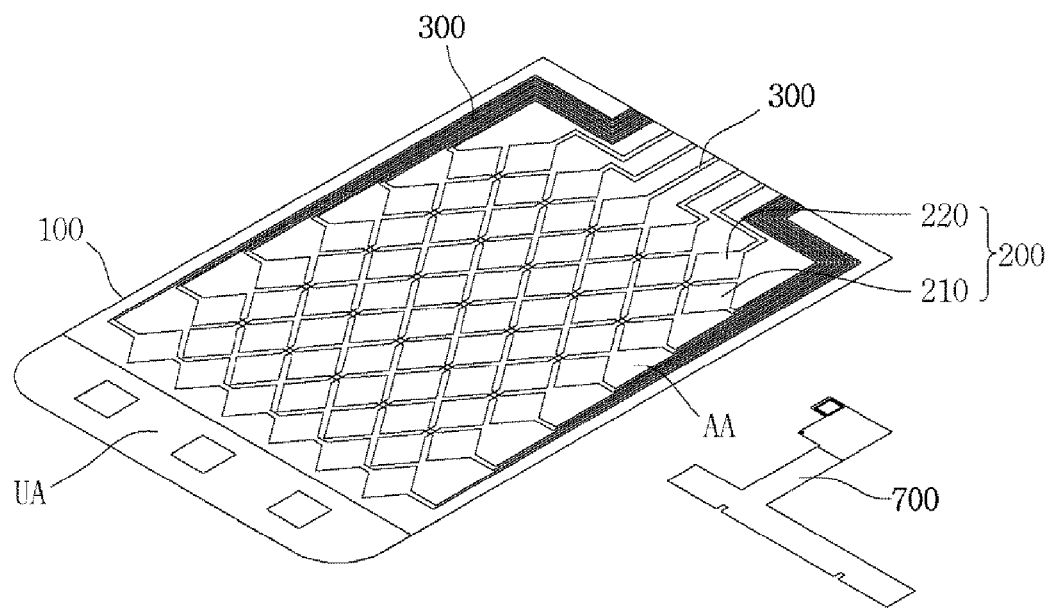

【FIG. 2】
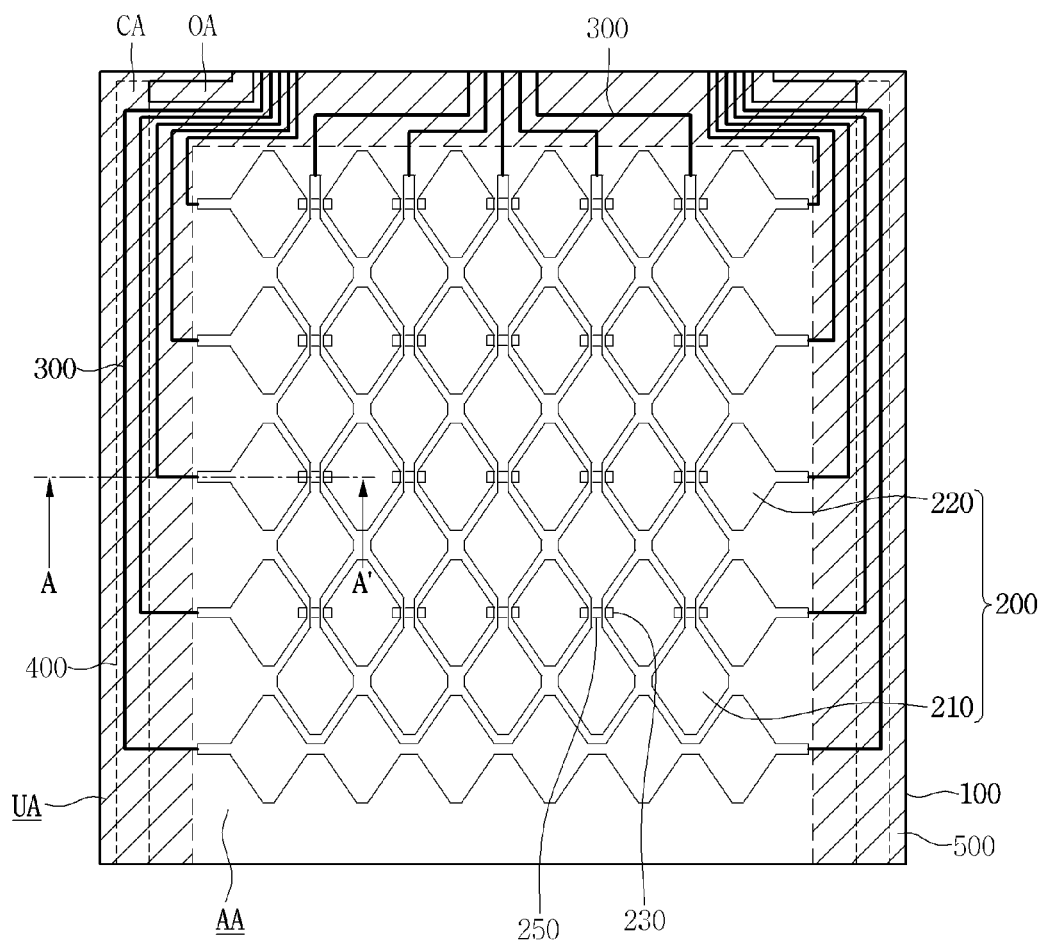
【FIG. 3】
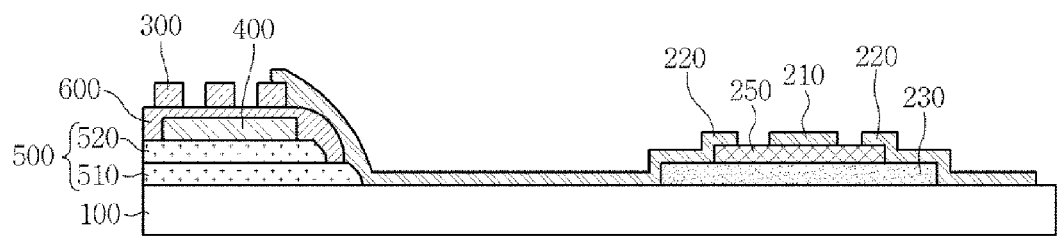

【FIG. 4】
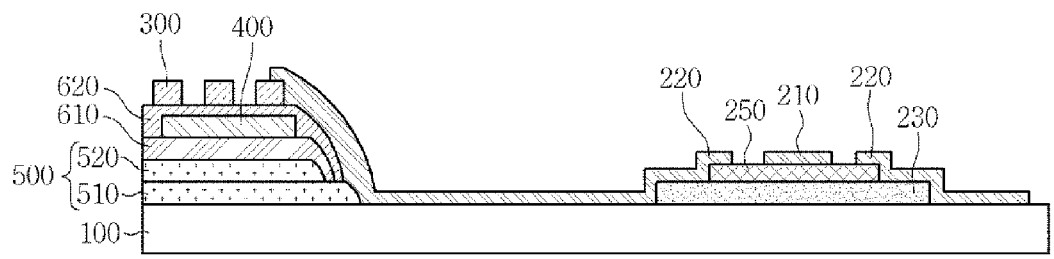
【FIG. 5】
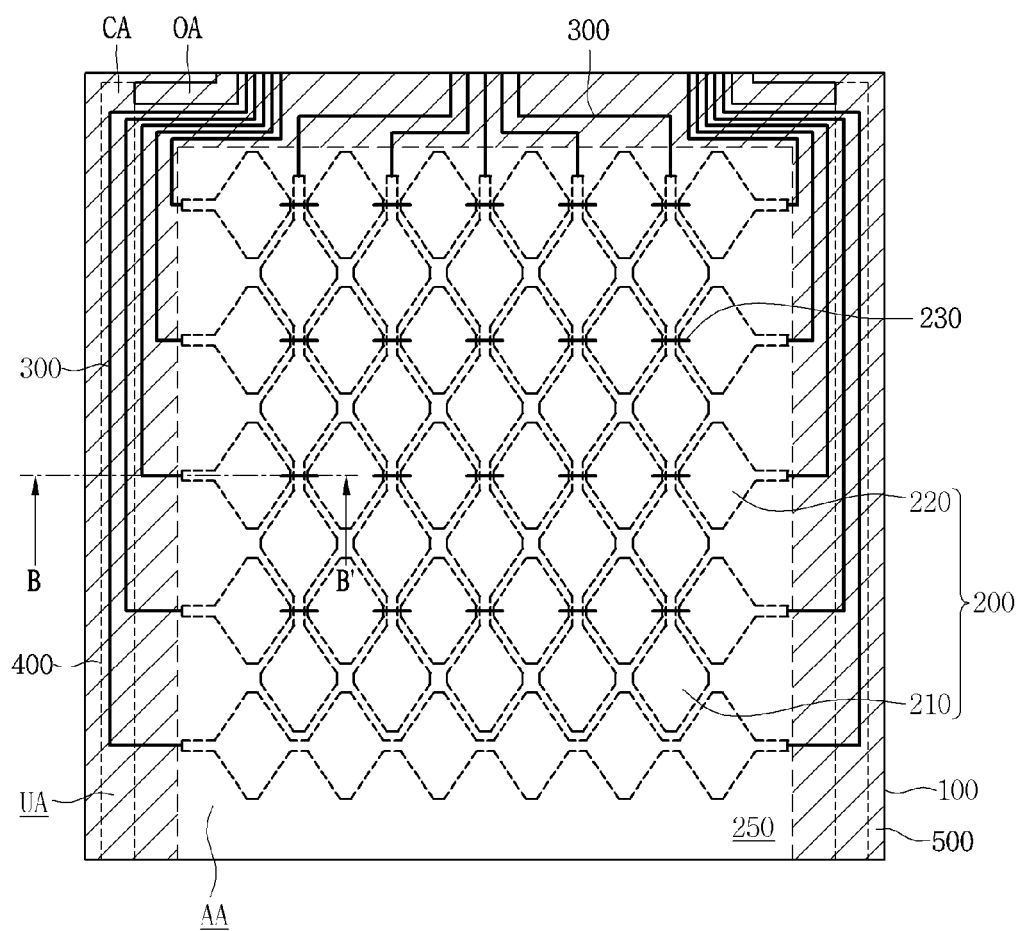

【FIG. 6】
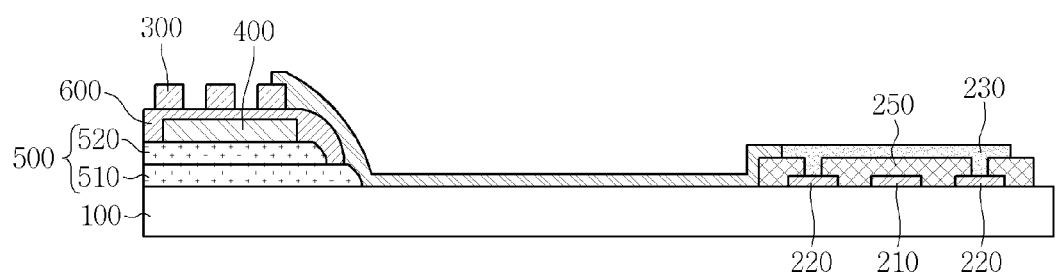
【FIG. 7】
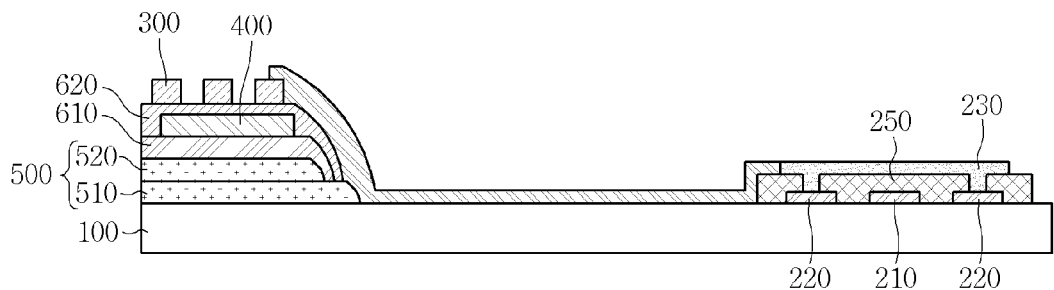

[FIG. 8]
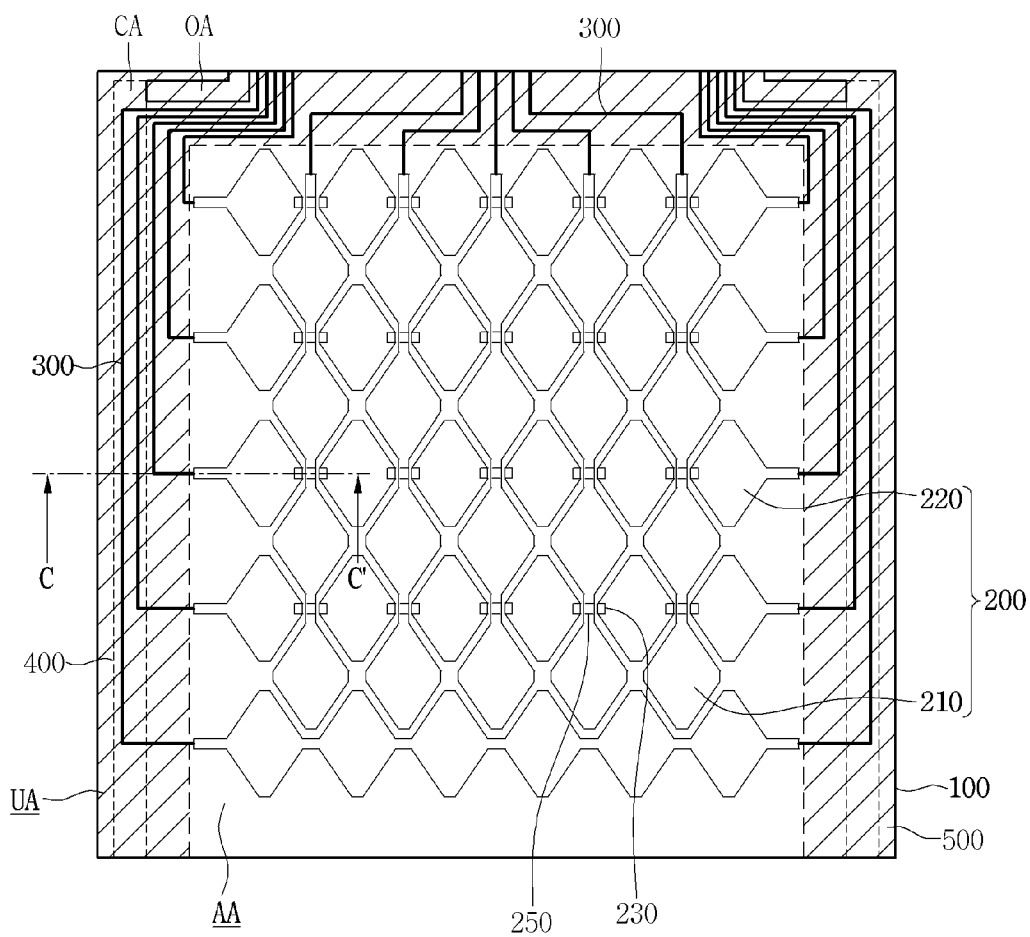
[FIG. 9]
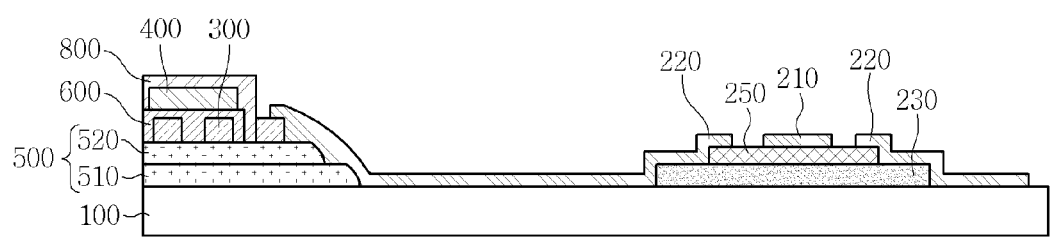

[FIG. 10]
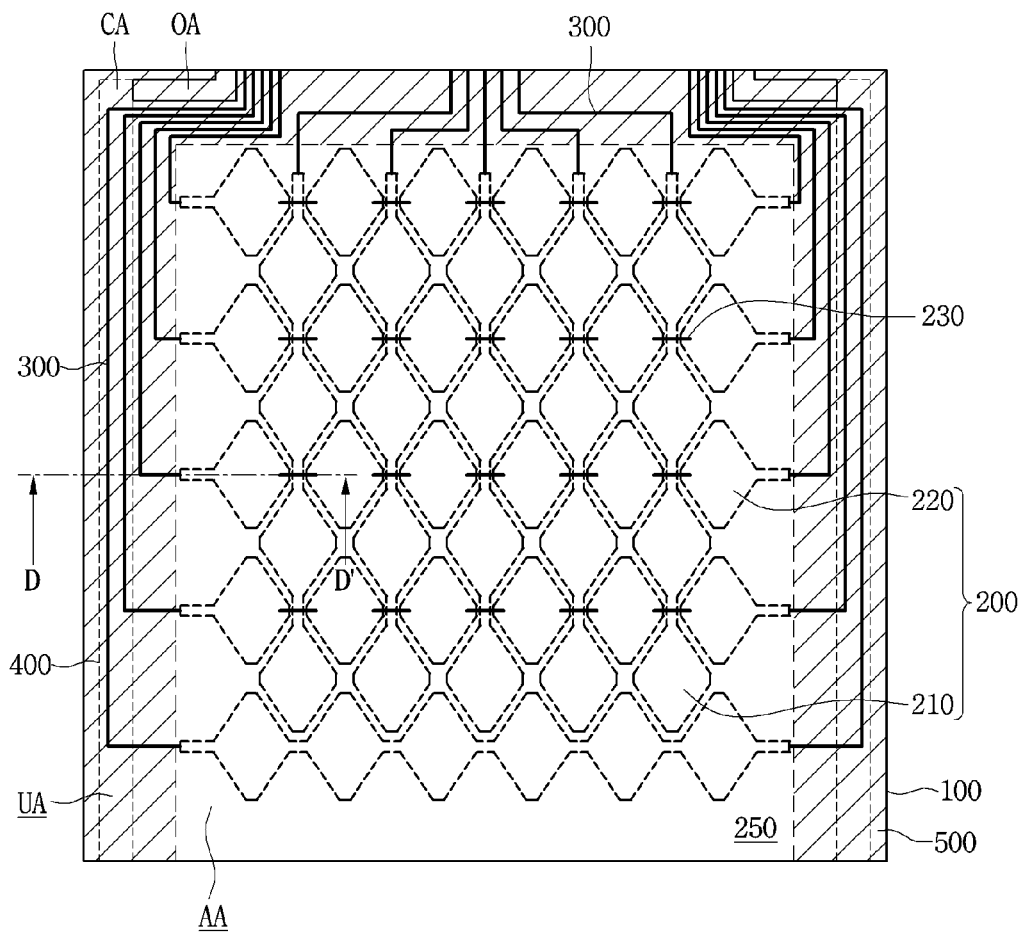
[FIG. 11]
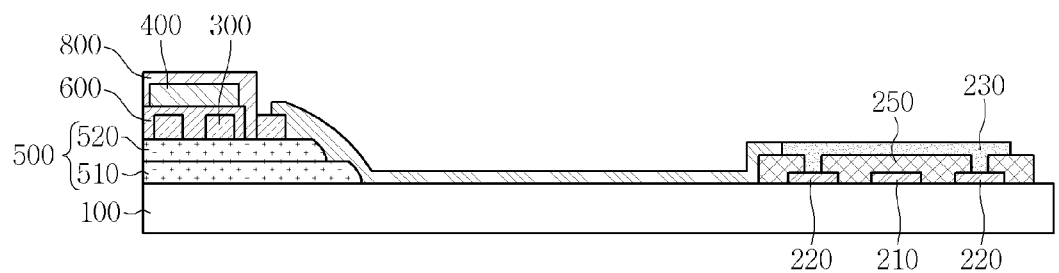

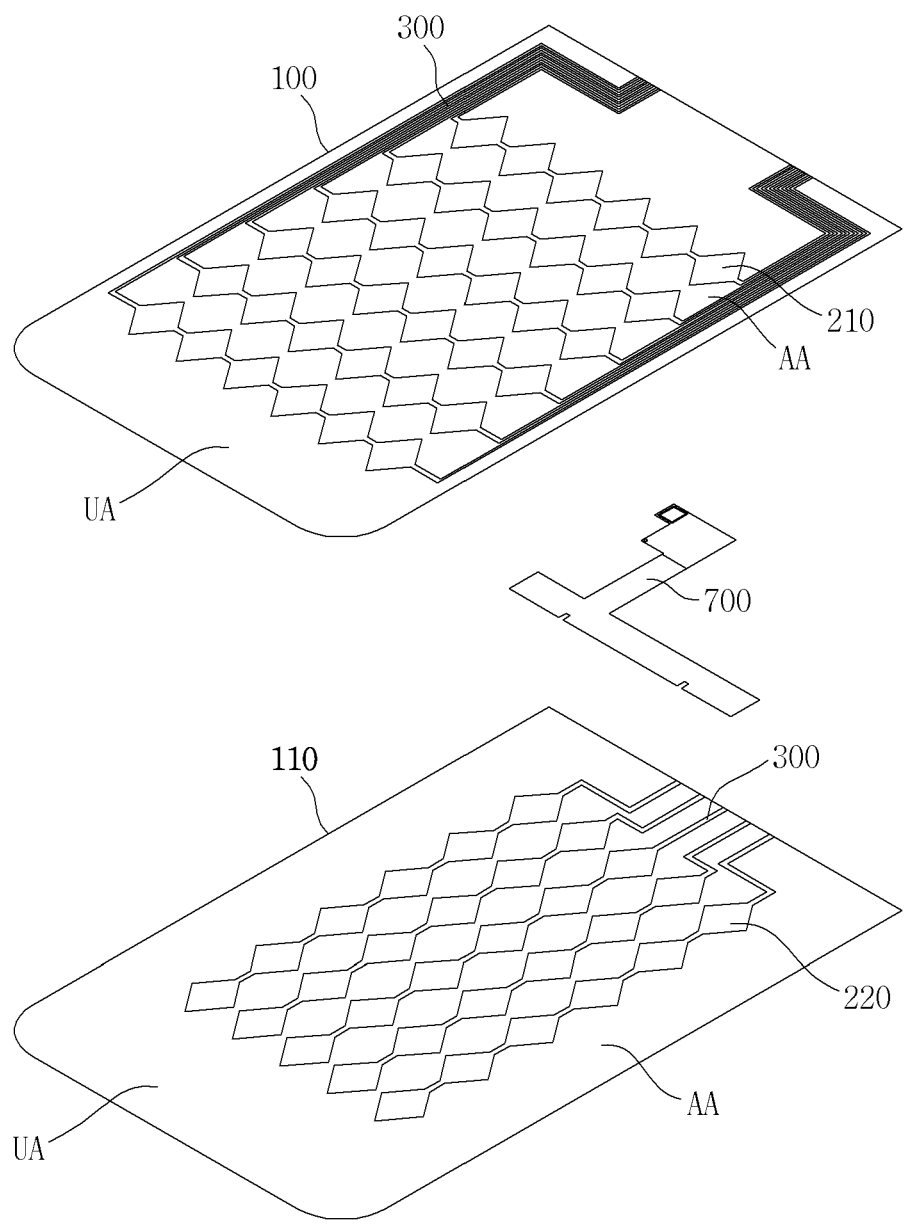

[FIG. 13]
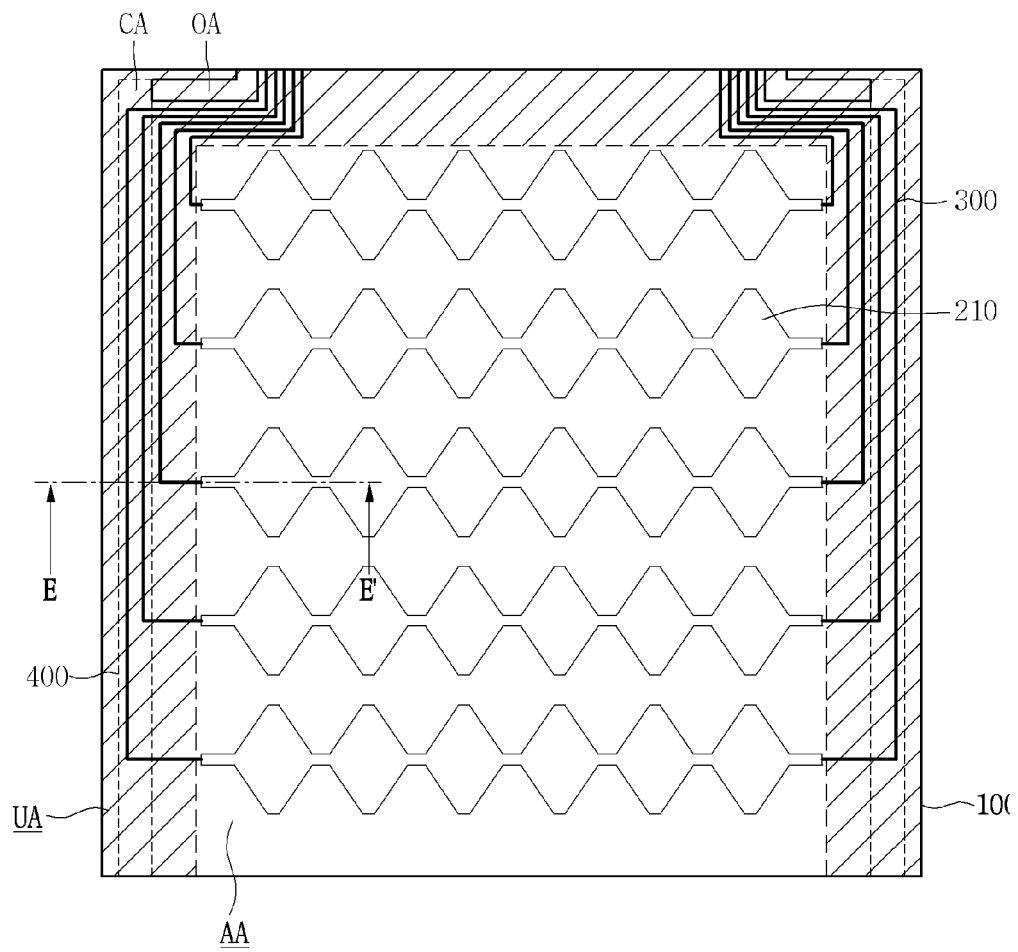
[FIG. 14]
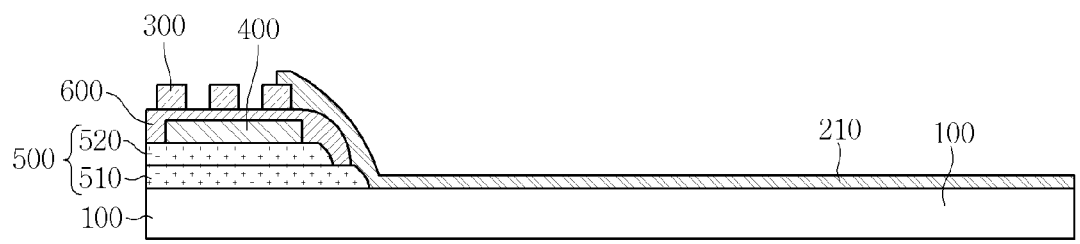

【FIG. 15】
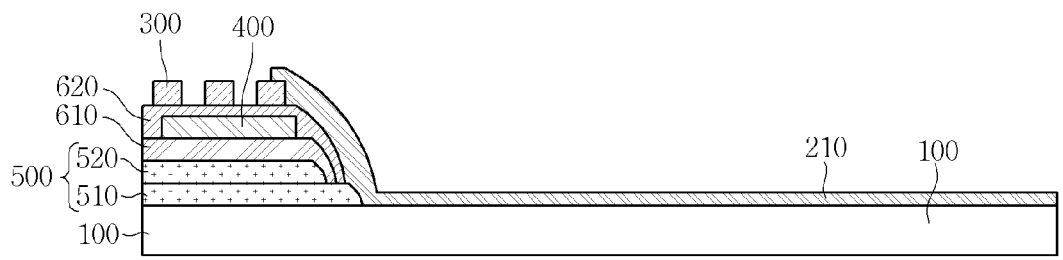
【FIG. 16】
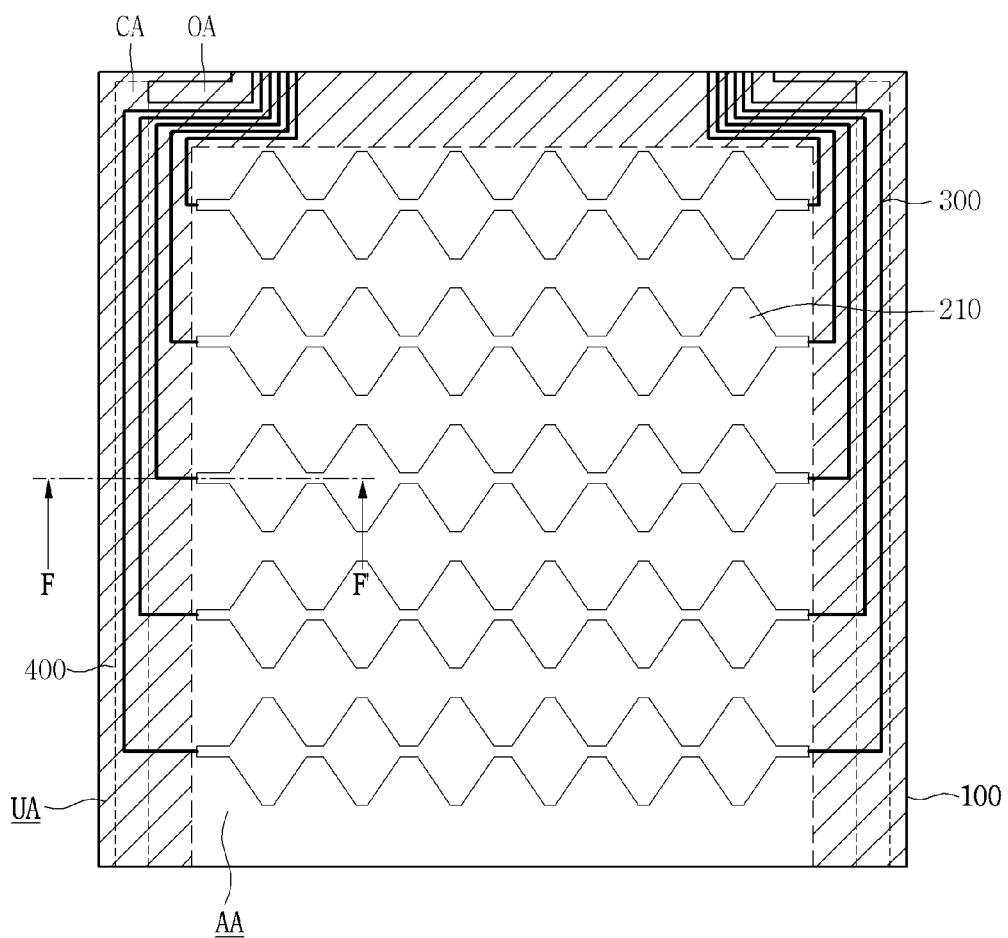

【FIG. 17】
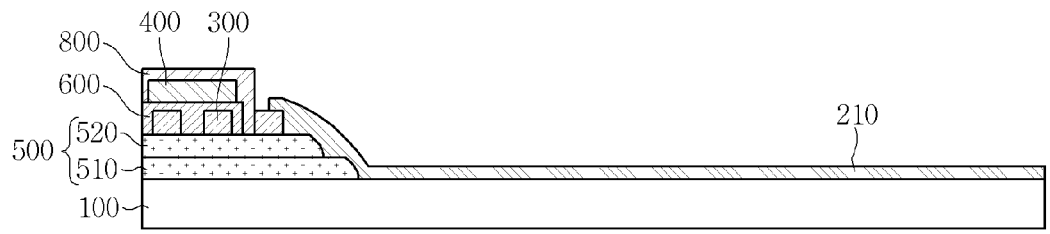
【FIG. 18】
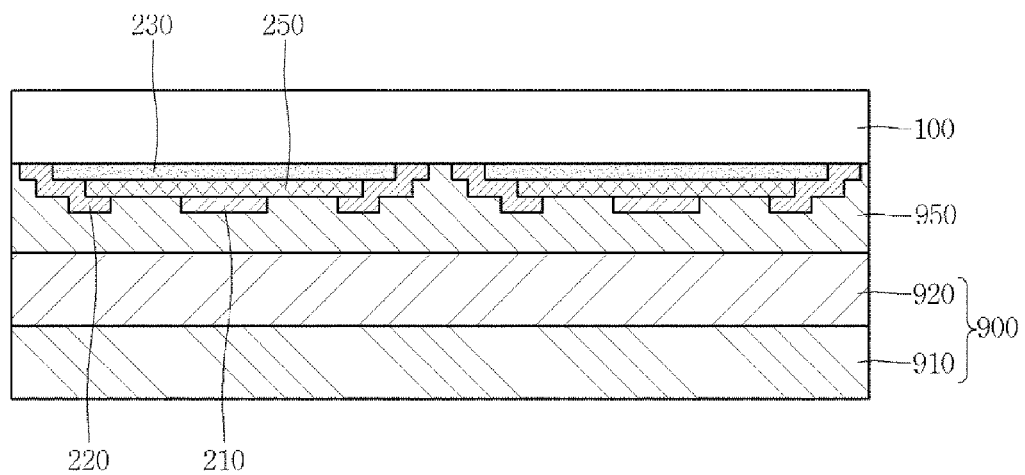
【FIG. 19】
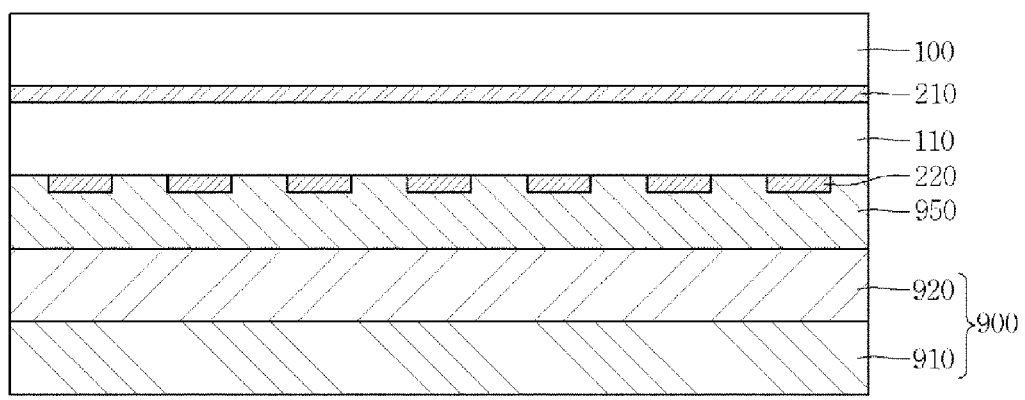

【FIG. 20】
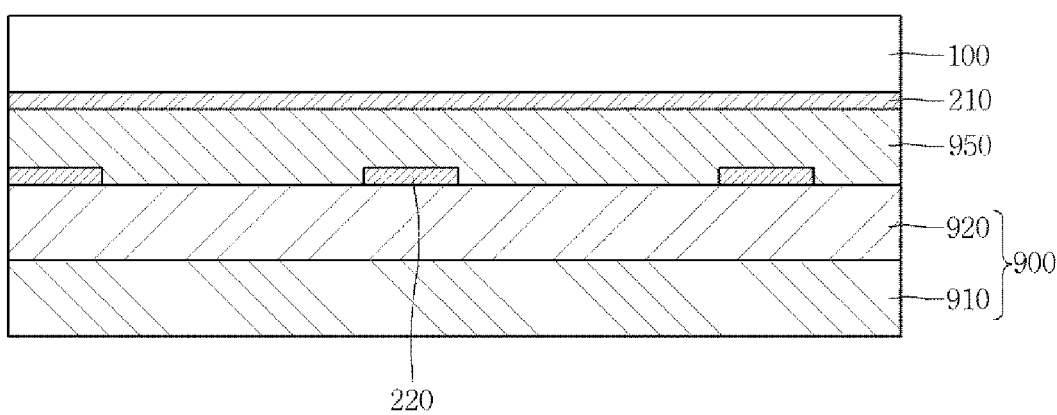
【FIG. 21】
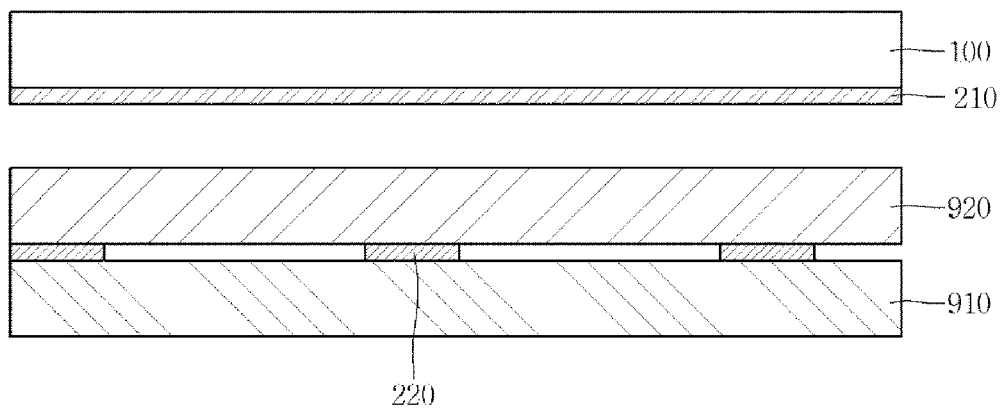

[FIG. 22]
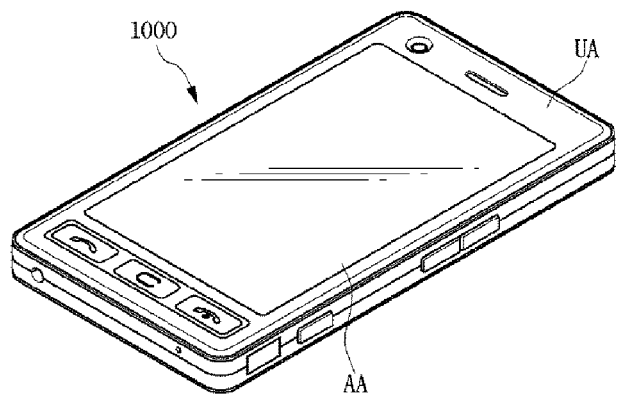
[FIG. 23]
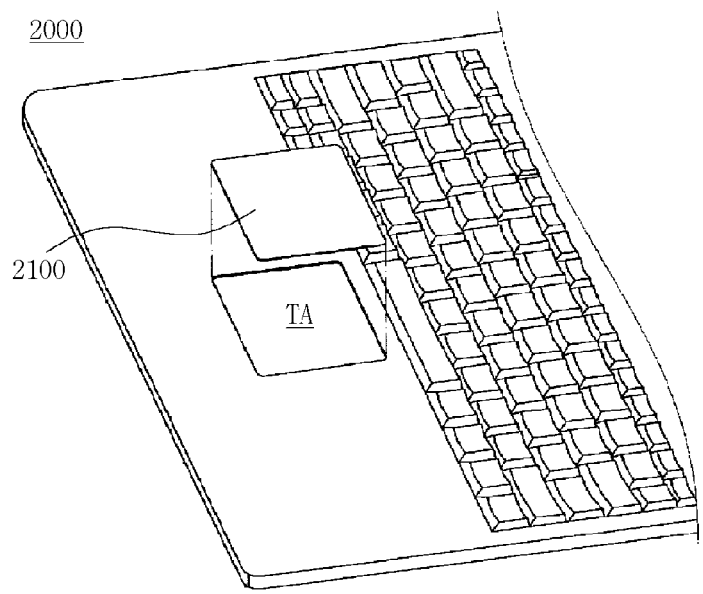
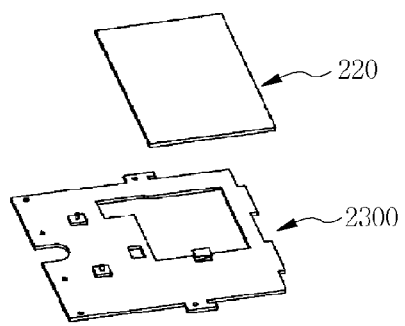

【FIG. 24】
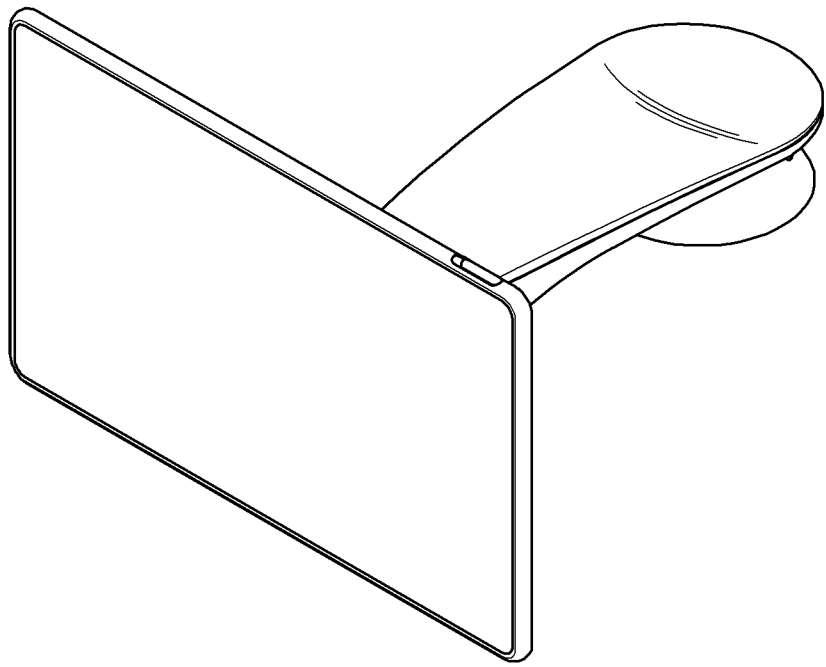
【FIG. 25】
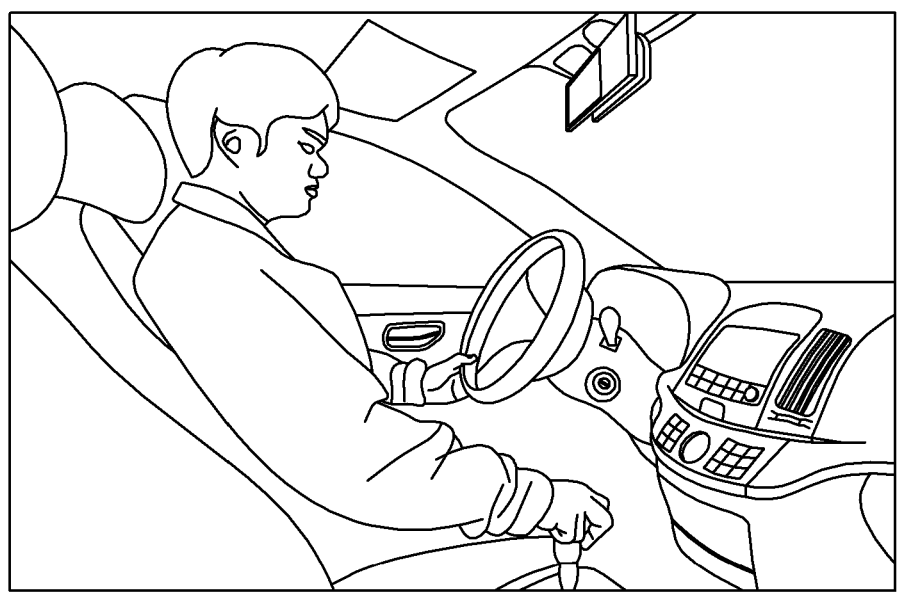

TOUCH PANEL

CROSS-REFERENCE TO RELATED APPLICATION

This application claims priority under 35 U.S.C. §119 to Korean Application No. 10-2013-0156718 filed on Dec. 16, 2013, whose entire disclosure is incorporated herein by reference.

BACKGROUND

1. Field

The embodiment relates to a touch panel.

2. Background

Recently, a touch panel, which performs an input function through the touch of an image displayed on a display device by an input device, such as a stylus pen or a finger, has been applied to various electronic appliances.

The touch panel may be provided in various types according to the location of a transparent electrode. For example, the transparent electrode may be directly formed on a cover substrate.

In this case, a printing layer may be formed in an unactive area on which any images are not displayed, and a wire electrode and a ground electrode may be formed on the printing layer. Since the ground electrode is provided on the printing layer, the ESD, which may be introduced from an outside, is blocked so that the touch sensitivity is improved.

However, since the ground electrode is formed on the unactive area of the cover substrate, that is, the printing layer with the wire electrode, a width of the ground electrode disposed on the printing layer is limited by a width of the wire electrode.

That is, although the efficiency of the ground electrode is proportional to the width of the ground electrode, when the width of the ground electrode is widened, the unactive area of the touch panel is enlarged so that left and right bezels are widened.

Thus, there is a need to provide a touch panel having a new structure, which is capable of effectively disposing a ground electrode while the bezel area of a touch panel is constantly maintained.

BRIEF DESCRIPTION OF THE DRAWINGS

The embodiments will be described in detail with reference to the following drawings in which like reference numerals refer to like elements wherein:

FIG. 1 is a perspective view showing touch panels according to the first to fourth embodiments.

FIG. 2 is a top view showing the touch panel according to the first embodiment.

FIGS. 3 and 4 are sectional views taken along line A-A' of FIG. 2.

FIG. 5 is a top view showing the touch panel according to the second embodiment.

FIGS. 6 and 7 are sectional views taken along line B-B' of FIG. 5.

FIG. 8 is a top view showing the touch panel according to the third embodiment.

FIG. 9 is a sectional view taken along line C-C' of FIG. 8.

FIG. 10 is a top view of the touch panel according to the fourth embodiment

FIG. 11 is a sectional view taken along line D-D' of FIG. 10.

FIG. 12 is a perspective view showing the touch panels according to the fifth and sixth embodiments.

FIG. 13 is a top view of a cover substrate according to the fifth embodiment.

FIGS. 14 and 15 are sectional views taken along line E-E' of FIG. 13.

FIG. 16 is a top view of a cover substrate according to the sixth embodiment.

FIG. 17 is a sectional view taken along line F-F' of FIG. 15.

FIGS. 18 to 21 are views showing a touch device in which a touch panel is coupled to a display panel according to an embodiment.

FIGS. 22 to 25 are views showing one example of a touch device to which a touch panel is applied according to an embodiment.

DETAILED DESCRIPTION

In the following description of the embodiments, it will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiment will be described with reference to accompanying drawings.

Referring to FIGS. 1 and 2, a touch panel according to an embodiment includes a cover substrate 100, a sensing electrode 200, a wire electrode 300, a conductive layer 400 and a printed circuit board 700.

The cover substrate 100 may be rigid or flexible. For example, the cover substrate 100 may include glass or plastic. In detail, the cover substrate 100 may include chemically tempered glass such as soda lime glass or aluminosilicate glass, plastic such as polyethylene terephthalate (PET) or polyamide (PI), or sapphire.

The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance.

In addition, a portion of the substrate 100 may be curved with a partial curved surface. That is, a portion of the substrate 100 may have a flat surface, and another portion of the substrate 100 may be curved with a curved surface. In detail, an end portion of the substrate 100 may be curved with a curved surface or may be curved or bent with a surface having a random curvature.

The substrate 100 may have an active area AA and an unactive area UA defined therein.

An image may be displayed in the active area AA and the image may not be displayed in the unactive area UA provided around the active area AA.

In addition, the position of an input device (e.g., finger) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point.

The active area AA of the substrate 100 may be provided with an electrode. In detail, the sensing electrode 200 may be disposed on the active area AA.

The sensing electrode 200 may include a conductive material.

For example, the sensing electrode 200 may include a transparent conductive material allowing electricity to flow without the interruption of light transmission. For example, the sensing electrode 200 may include metallic oxide such as indium tin oxide, indium zinc oxide, copper oxide, tin oxide, zinc oxide, or titanium oxide.

However, the embodiment is not limited to the above, and the sensing electrode 200 may include nanowire, photosensitive nanowire film, carbon nanotube (CNT), graphene, or conductive polymer.

In addition, the sensing electrode 200 may include various metals. For example, the sensing electrode 200 may include at least one of chromium (Cr), nickel (Ni), copper (Cu), aluminum (Al), silver (Ag), molybdenum (Mo), and the alloy thereof.

In addition, the sensing electrode 200 may include sub-electrodes crossing each other. The sensing electrode 200 may be substantially formed in the shape of a mesh shape by the sub-electrodes.

The sensing electrode 200 is depicted in a rhombus shape in the drawings but, the embodiment is not limited thereto. The sensing electrode 200 may be formed in various shapes such as a polygonal shape including a triangular shape and a rectangular shape, a circular shape, a linear shape, an H-shape or an elliptical shape.

The sensing electrode 200 may include first and second electrodes 210 and 220.

The first sensing electrode 210 may extend in the first direction on the active area AA of the cover substrate 100. The first sensing electrode 210 may make direct contact with the cover substrate 100. In addition, the second sensing electrode 220 may extend in the second direction on the active area AA of the cover substrate 100.

In detail, the second sensing electrode 220 may extend in the second direction different from the first direction while making direct contact with the cover substrate 100. That is, the first and second sensing electrodes 210 and 220 may be disposed on the same surface of the cover substrate 100 and may extend in mutually different directions on the same surface of the cover substrate 100.

The first and second sensing electrodes 210 and 220 may be disposed on the cover substrate 100 while being insulated from each other.

Referring to FIGS. 2 to 4, the bridge electrode 230 may be provided on one surface of the cover substrate 100, on which the sensing electrode 200 is disposed. For example, the bridge electrodes 230 may be arranged in a bar shape. In detail, the bridge electrodes 230 may be spaced apart from each other by a predetermined interval on the active area AA while being provided in the bar shape.

An insulating material 250 may be provided on the bridge electrode 230. In detail, the insulating material 250 may be partially formed on the bridge electrode 230, so that a part of the bridge electrode 230 may be covered with the insulating material 250. For example, when the bridge electrode 230 is formed in a bar shape, the insulating material 250 may be formed on the bridge electrode 230 except for one end and the opposite end of the bridge electrode 230, that is, both ends of the bridge electrode 230.

The first sensing electrodes 210 may are connected to each other and may extend on the insulating material 250. For example, the first sensing electrodes 210 extending in the first direction may be disposed to be connected to each other on the insulating material 250.

In addition, the second sensing electrode 220 may be disposed to be connected to the bridge electrode 230. In detail, the second sensing electrodes 220 spaced apart from each other may be connected to the bridge electrodes 230. Thus, the second sensing electrodes 220 may extend in the second direction.

Thus, the first and second sensing electrodes 210 and 220 may be electrically connected to each other without being short-circuited to each other due to the bridge electrodes and the insulating material.

A printing layer 500 and an insulating layer 600 may be provided on the unactive area UA of the cover substrate 100.

The printing layer 500 may extend along an edge of the cover substrate 100. The printing layer 500 may be formed by coating black or white ink according to a desired outer appearance. The printing layer 500 allows a wire electrode, which will be described below, not to be seen from an outside. In addition, a pattern for forming a desired logo may be formed on the printing layer 500.

The printing layer 500 may be formed in at least one layer. For example, the printing layer 500 may include first and second printing layers 510 and 520.

The first printing layer 510 may be provided on one surface of the cover substrate 100. In addition, the second printing layer 520 may be provided on one surface of the first printing layer 510. The first printing layer 510 may have a width different from that of the second printing layer 520.

However, the embodiment is not limited to above, but third and fourth printing layers may be further formed on the second printing layer. In the description below, the printing layer having two layers will be mainly described, and in addition, the configuration applied to this embodiment may be applicable to another embodiment in the same manner.

Referring to FIG. 3, the touch panel according to the first embodiment may include a conductive layer 400 provided on the printing layer 500.

The conductive layer 400 may be formed by depositing a conductive material on the second printing layer 520. The conductive layer 400 may include a material equal or similar to that of at least one of the sensing electrode 200 and the bridge electrode 230. In addition, the conductive layer 400 may be formed simultaneously with the bridge electrode 230 by using the conductive material.

In addition, the conductive layer 400 may be formed simultaneously with at least one of the first and second sensing electrodes 210 and 220.

The conductive layer 400 may be provided on the second printing layer 520 to serve as a ground electrode.

The insulating layer 600 may be provided on the conductive layer 400. In detail, referring to FIGS. 1 and 3, the insulating layer 600 may partially cover the conductive layer 400. Thus, the conductive layer 400 may include a close part CA which is covered with the insulating layer 600 and an open part OA which is exposed to an outside without being covered with the insulating layer 600.

The insulating layer 600 may include a resin-based insulating material. For example, the insulating layer 600 may include at least one of acrylic resin, silicon resin, urethane resin and epoxy resin.

The insulating layer 600 may include a material equal or similar to the insulating material 250 provided on the active area AA. For example, when the insulating material 250 is provided on the active area AA, the insulating material 250 may be disposed simultaneously with the insulating layer 600 by coating the same insulating material on the unactive area UA, that is, the conductive layer 400.

The wire electrode 300 may be disposed on the insulating layer 600. The wire electrode 300 may include a material equal or similar to that of the sensing electrode 200 or the bridge electrode 230. The wire electrode 300 may be electrically connected to the sensing electrode without being short-circuited with the conductive layer 400 due to the insulating layer 600.

One end of the wire electrode 300 may be connected to the sensing electrode 200 and the opposite end may be connected to the printed circuit board 700. In detail, the wire electrode 300 may be connected to the sensing electrode 200 and may be drawn out to an upper or lower end of the cover substrate 100, so that the wire electrode 300 may be connected to the printed circuit board 700. For example, the wire electrode 300 may be connected to a flexible printed circuit board (FPCB) by using a pad part and an anisotropic conductive film (ACF), so that the wire electrode 300 may be connected to an external circuit.

The conductive layer 400 may make contact with the printed circuit bard 700 through the open area OA.

Referring to FIG. 4, the first and second printing layers 510 and 520 may be disposed on the unactive area of the cover substrate 100.

The first insulating layer 610 may be disposed on the second printing layer 520. The first insulating layer 610 may include the same material as the insulating material 250 disposed on the bridge electrode 230 in the active area of the cover substrate 100. That is, the first insulating layer 610 may be formed simultaneously with the insulating material 250 by using the same material.

The conductive layer 400 may be disposed on the first insulating layer 610. The conductive layer 400 may include the same material as the sensing electrode. In detail, the conductive layer 400 may include the same material as the first and second sensing electrodes 210 and 220. The conductive layer 400 may be formed simultaneously with the first and second sensing electrodes 210 and 220 by using the same material.

The second insulating layer 620 may be provided on the conductive layer 400. In detail, the second insulating layer 620 may partially cover the conductive layer 400. Thus, the conductive layer 400 may include a close part CA which is covered with the second insulating layer 620 and an open part OA which is exposed to an outside without being covered with the insulating layer 600.

The second insulating layer 620 may include a material equal to or different from that of the first insulating layer 610. For example, the first and second insulating layer 610 and 620 may include at least one of acrylic resin, silicon resin, urethane resin and epoxy resin.

The wire electrode 300 may be disposed on the second insulating layer 620. As described above, the wire electrode 300 may include a material equal or similar to that of the sensing electrode. The wire electrode 300 may be electrically connected to the sensing electrode without being short-circuit with the conductive layer 400 due to the second insulating layer 620.

One end of the wire electrode 300 may be connected to the sensing electrode 200 and the opposite end may be connected to the printed circuit board 700. In detail, the wire electrode 300 may be connected to the sensing electrode 200 and may be drawn out to an upper or lower end of the cover substrate 100, so that the wire electrode 300 may be connected to the printed circuit board 700. For example, the wire electrode 300 may be connected to a flexible printed circuit board (FPCB) by using a pad part and an anisotropic conductive film (ACF), so that the wire electrode 300 may be connected to an external circuit.

In addition, the conductive layer 400 may be connected to the printed circuit bard 700 through the open area OA.

Hereinafter, a touch panel according to the second embodiment will be described with reference to FIGS. 5 to 7. In the following description about the touch panel according to the second embodiment, the parts similar or identical to those of the previously described first embodiment will be omitted for the purpose of clear and brief description.

In the touch panel according to the second embodiment, the positions of the first and second sensing electrodes 210 and 220, the insulating material 250 and the bridge electrode 230 disposed on the active area of the cover substrate 100 may be different from those of the touch panel according to the first embodiment.

For example, referring to FIGS. 5 to 7, the first and second sensing electrodes 210 and 220 may make direct contact with one surface of the cover substrate 100. In addition, the insulating material 250 may be disposed on the first and second sensing electrodes 210 and 220. The insulating material 250 may be disposed to partially expose the second sensing electrode 220 while surrounding the first and second sensing electrodes 210 and 220. For example, a hole H exposing the second sensing electrode 220 may be formed on the insulating material 250.

The bridge electrode 230 may be disposed on the insulating material 250. The bridge electrode 230 may be disposed on the insulating material 250 to connect the second sensing electrodes 220 to each other through the hole H.

In the following description, since the wire electrode 300, the conductive layer 400, the printing layer 500 and the insulating layer 600 of FIGS. 6 and 7 are identical to those of the first embodiment previously described, the details thereof will be omitted.

Hereinafter, a touch panel according to the third embodiment will be described with reference to FIGS. 8 and 9. In the following description about the touch panel according to the third embodiment, the parts similar or identical to those of the touch panel according to the first embodiment previously described will be omitted for the purpose of clear and brief description.

In the touch panel according to the third embodiment, the structure on the unactive area of the cover substrate 100 may be different from that of the touch panel according to the first embodiment.

Referring to FIGS. 8 and 9, according to the touch panel of the third embodiment, the first and second printing layers 510 and 520 may be disposed on the unactive area of the cover substrate 100.

In addition, the wire electrode 300 may be disposed on the second printing layer 520.

One end of the wire electrode 300 may be connected to the sensing electrode 200 and the opposite end may be connected to the printed circuit board 700. In detail, the wire electrode 300 may be connected to the sensing electrode 200 and may be drawn out to an upper or lower end of the cover substrate 100, so that the wire electrode 300 may be connected to the printed circuit board 700. For example, the wire electrode 300 may be connected to a flexible printed circuit board (FPCB) by using a pad part and an anisotropic conductive film (ACF), so that the wire electrode 300 may be connected to an external circuit.

The insulating layer 600 may be disposed on the wire electrode 300. The conductive layer 400 may be disposed on the insulating layer 600.

The wire electrode 300 may be electrically connected to the sensing electrode without being short-circuit with the conductive layer 400 due to the insulating layer 600.

A protective layer 800 may be further provided on the conductive layer 400. In detail, the protective layer 800 may partially cover the conductive layer 400. Thus, referring to FIG. 8, the conductive layer 400 may include a close part CA which is covered with the protective layer 800 and an open part OA which is exposed to an outside without being covered with the protective layer.

In addition, the conductive layer 400 may be connected to the printed circuit board 700 through the open area OA.

Hereinafter, a touch panel according to the fourth embodiment will be described with reference to FIGS. 10 and 11. In the following description about the touch panel according to the fourth embodiment, the parts similar or identical to those of the third embodiment previously described will be omitted for the purpose of clear and brief description.

In the touch panel according to the fourth embodiment, the positions of the first and second sensing electrodes 210 and 220, the insulating material 250 and the bridge electrode 230 disposed on the active area of the cover substrate 100 may be different from those of the touch panel according to the third embodiment.

For example, referring to FIGS. 10 and 11, the first and second sensing electrodes 210 and 220 may make direct contact with one surface of the cover substrate 100. In addition, the insulating material 250 may be disposed on the first and second sensing electrodes 210 and 220. The insulating material 250 may be disposed to partially expose the second sensing electrode 220 while surrounding the first and second sensing electrodes 210 and 220. For example, a hole H exposing the second sensing electrode 220 may be formed on the insulating material 250.

The bridge electrode 230 may be disposed on the insulating material 250. The bridge electrode 230 may be disposed on the insulating material 250 to connect the second sensing electrodes 220 to each other through the hole H.

In the following description, since the wire electrode 300, the conductive layer 400, the printing layer 500 and the insulating layer 600 of FIG. 11 are identical to those of the third embodiment previously described, the details thereof will be omitted.

Hereinafter, a touch panel according to the fifth and the sixth embodiments will be described with reference to FIGS. 12 to 17. In the following description about the touch panels according to the fifth and sixth embodiments, the parts similar or identical to those of the touch panel according to the first to fourth embodiments previously described will be omitted for the purpose of clear and brief description.

Referring to FIG. 12, the touch panel according to the fifth and sixth embodiments may further include a substrate 110 on the cover substrate 100.

The substrate 110 may be disposed on a low portion of the cover substrate 100. The cover substrate 100 and the substrate 110 may be bonded to each other through OCA or a transparent adhesive layer such as OCA. In addition, the substrate 110 may include a material equal or similar to a material constituting the cover substrate 100.

The first sensing electrode 210 may be disposed on the cover substrate 100. In addition, the second sensing electrode 220 may be disposed on the substrate 110.

Referring to FIGS. 13 to 15, the first sensing electrode 210 extending in one direction may be only disposed on the active area of the cover substrate 100 in the touch panel according to the fifth embodiment.

In addition, the wire electrode 300, the conductive layer 400, the printing layer 500 and the insulating layer 600 may be disposed on the unactive area.

In the touch panel according to the fifth embodiment, the insulating layer may be formed through a separated process.

In the following description, since the wire electrode 300, the conductive layer 400, the printing layer 500 and the insulating layer 600 of FIGS. 14 and 15 are identical to those of the first embodiment previously described, the details thereof will be omitted.

Referring to FIGS. 16 and 17, according to the touch panel of the sixth embodiment, the first sensing electrode 210 extending in one direction may be disposed on the active area of the cover substrate 100.

In addition, the wire electrode 300, the conductive layer 400, the printing layer 500 and the insulating layer 600 may be provided on the unactive area.

In the touch panel according to the sixth embodiment, the insulating layer may be formed through a separated process.

In the following description, since the wire electrode 300, the conductive layer 400, the printing layer 500 and the insulating layer 600 of FIG. 17 are identical to those of the third embodiment previously described, the details thereof will be omitted.

According to the touch panel of the embodiments, the ESD shielding effect and process efficiency of the touch panel may be improved.

According to the touch panel of the embodiment, the ground and wire electrodes are formed at mutually different locations, so that the ground electrode may be provided in a sufficient width without regard to the wire electrode when the ground electrode is formed.

That is, there is a limitation to widen the width of the ground electrode, which is formed on the printing layer disposed on the unactive area of the cover substrate, due to the wire electrode formed on the printing layer together with the ground electrode, however, according to the touch panel of the embodiment, after one of the ground and wire electrodes is disposed on the printing layer, the insulating layer is disposed on the ground electrode or the wire electrode, and then the reaming one of the ground electrode and the wire electrode is provided on the insulating layer, so that the ground and wire electrodes may be provided at mutually different locations. Thus, when the ground electrode is disposed, the ground electrode may be provided in a sufficient width regardless of the width of the wire electrode, so that the ESD shield effect is enhanced.

In addition, since the ground electrode and the insulating layer can be simultaneously formed when the sensing and bridge electrodes and the insulating material are formed by using the same material, the processes of forming the ground electrode and the insulating layer may be omitted, so that the process efficiency can be improved.

Hereinafter, a touch device, in which the touch panel described above is coupled with a display panel, will be described with reference to FIGS. 18 to 21.

Referring to FIGS. 18 and 19, a touch device may include a touch panel disposed on the display panel 900.

In detail, referring to FIG. 18, the touch device may be formed by coupling the cover substrate 100 and the display panel 900 to each other. The cover substrate 100 and the display panel 900 may be adhesive to each other through an adhesive layer 950. For example, the cover substrate 100 and the display panel 900 may be bonded to each other through the adhesive layer 950 including optical clear adhesive (OCA).

In addition, referring to FIG. 19, when the substrate 110 is disposed on the cover substrate 100, the touch device may be formed by coupling the substrate 110 and the display panel 900. The substrate 110 and the display panel 900 may be adhesive to each other through the adhesive layer 950. For example, the substrate 110 and the display panel 900 may be bonded to each other through the adhesive layer 950 including optical clear adhesive (OCA).

The display panel 900 may include first and second substrates 910 and 920.

If the display panel 900 is a liquid crystal display panel, the display panel 900 may have a structure in which the first substrate 910 including a thin film transistor (TFT) and a pixel electrode is combined with the second substrate 920 including color filter layers while a liquid crystal layer is interposed between the first and second substrates 910 and 920.

Further, the display panel 900 may be a liquid crystal display panel having a color filter on transistor (COT) structure formed by combining the first substrate 910 formed thereon with the TFT, a color filter, and a black matrix with the second substrate 920 while the liquid crystal layer is interposed between the first and second substrates 910 and 920. In other words, the TFT may be formed on the first substrate 910, a protective layer may be formed on the TFT, and the color filter layer may be formed on the protective layer. In addition, the pixel electrode, which makes contact with the TFT, is formed on the first substrate 910. In this case, to improve an aperture ratio and simplify a mask process, the black matrix may be omitted, and a common electrode may perform a function of the black matrix together with the inherent function thereof.

In addition, when the display panel 900 is a liquid crystal panel, the display device may further include a backlight unit for supplying light onto a rear surface of the display panel 900.

When the display panel 900 is an organic light emitting device, the display panel 900 includes a self light-emitting device which does not require any additional light source. A thin film transistor is formed on the first substrate 910 of the display panel 900, and an organic light-emitting device (OLED) making contact with the thin film transistor is formed. The OLED may include an anode, a cathode and an organic light-emitting layer formed between the anode and the cathode. In addition, the display panel 900 may further include the second substrate 920, which performs the function of an encapsulation substrate for encapsulation, on the OLED.

Referring to FIG. 20, the touch device according to the embodiment may include a touch panel integrated with the display panel 900. That is, a substrate for supporting at least one sensing electrode may be omitted.

In detail, at least one sensing electrode may be disposed on at least one surface of the display panel 900. That is, at least one sensing electrode may be formed on at least one surface of the first or second substrate 910 or 920.

In this case, at least one sensing electrode may be formed on a top surface of the substrate disposed at an upper portion.

Referring to FIG. 20, the first sensing electrode 210 may be disposed on one surface of the cover substrate 100. In addition, the first wire connected to the first sensing electrode 210 may be disposed. Further, the second sensing electrode 220 may be disposed on one surface of the display panel 900. In addition, the second wire connected to the second sensing electrode 220 may be disposed.

An adhesive layer 950 may be interposed between the cover substrate 100 and the display panel 900, so that the cover substrate 100 may be combined with the display panel 900.

A polarizing plate disposed at a low portion of the cover substrate 100 may be further included. The polarizing plate may be a linear polarizing plate or an anti-reflection polarizing plate. For example, when the display panel 900 is a liquid crystal display panel, the polarizing plate may be a linear polarizing plate. In addition, when the display panel 900 is an organic electroluminescent display panel, the polarizing plate may be an anti-reflection polarizing plate.

A touch device according to an embodiment may allow at least one substrate supporting a sensing electrode to be omitted. For this reason, a touch device having a thin thickness and a light weight may be formed.

Hereinafter, a touch device according to still another embodiment will be described with reference to FIG. 21. In the following description, the parts similar or identical to those of the previously described embodiment will be omitted for the purpose of clear and brief description. The same reference numbers will be assigned to the same elements.

Referring to FIG. 21, a touch device according to an embodiment may include a touch panel integrated with the display panel 900. That is, a substrate for supporting at least one sensing electrode may be omitted.

For example, a sensing electrode, which serves as a sensor disposed in an active area to sense a touch, and a wire, through which an electrical signal is applied to the sensing electrode, may be formed inside the display panel. In detail, at least one sensing electrode or at least one wire may be disposed inside the display panel.

The display panel includes the first and second substrates 910 and 920. In this case, at least one of the first and second sensing electrodes 210 and 220 is disposed between the first and second substrates 910 and 920. That is, at least one sensing electrode may be disposed on at least one surface of the first or second substrate 910 or 920.

Referring to FIG. 21, the first sensing electrode 210 may be disposed on one surface of the cover substrate 100. In addition, the first wire connected to the first sensing electrode 210 may be disposed. Further, the second sensing electrode 220 and the second wire may be disposed between the first and second substrates 910 and 920. That is, the second sensing electrode 220 and the second wire may be disposed inside the display panel, and the first sensing electrode 210 and the first wire may be disposed outside the display panel.

The second sensing electrode 220 and the second wire may be disposed on the top surface of the first substrate 910 or the rear surface of the second substrate 920.

In addition, a polarizing plate disposed at a lower portion of the cover substrate 100 may be further included.

When the display panel is a liquid crystal display panel and the second sensing electrode is formed on the top surface of the first substrate 910, the sensing electrode may be formed with a thin film transistor (TFT) or a pixel electrode. In addition, when the sensing electrode is formed on the rear surface of the second substrate 920, a color filter layer may be formed on the sensing electrode or the sensing electrode may be formed on the color filter layer. When the display panel is an organic light emitting device and the second sensing electrode is formed on the top surface of the first substrate 910, the second sensing electrode may be formed with a thin film transistor or an organic light emitting device.

The touch device according to an embodiment may allow at least one substrate supporting a sensing electrode to be omitted. For this reason, the touch device having a thin thickness and a light weight may be formed. In addition, the sensing electrode and the wire are formed with a device formed on the display panel, so that the process may be simplified and the cost may be reduced.

FIGS. 22 to 25 show one example of a touch device including the touch panel described above.

Referring to FIG. 22, a mobile terminal may include an active area AA and an unactive area UA. The active area AA may sense a touch signal through the touch by a finger, and a command icon pattern part and a logo may be formed in the unactive area UA.

In addition, referring to FIG. 23, there is depicted a laptop computer as one example of a display. The laptop computer may include a touch panel 2200, a touch sheet 2100 and a circuit board 2300. The touch sheet 2100 is disposed on a top surface of the touch panel 2200. The touch sheet may protect a touch area TA. Further, the touch sheet 2100 may improve the touch sensitivity of a user. The circuit board 2300 electrically connected to the touch panel 2200 is provided on a bottom surface of the touch panel 2200. Various kinds of components included in the laptop computer may be mounted on the circuit board 2300 which includes a printed circuit board.

Referring to FIG. 24, the touch panel may be applied to a vehicle navigation system 3000.

In addition, referring to FIG. 25, the touch panel may be applied to an inner part of a vehicle. In other words, the touch panel may be applied to various parts in the vehicle. Accordingly, the touch panel may be applied to a dashboard as well as a PND (Personal Navigation Display), so that a CID (Center Information Display) may be realized. However, the embodiment is not limited to the above, and the touch panel may be used for various electronic appliances and may be applied to a wearable device worn by a human body.

The embodiment provides a touch panel having a new structure, which is capable of providing improved reliability and ESD shielding efficiency.

According to the embodiment, there is provided a touch panel which includes: a cover substrate including an active area and an unactive area; a printing layer on the unactive area; a conductive layer on the printing layer; an insulating layer on the printing layer; and a wire electrode insulated from the conductive layer by the insulating layer.

According to the touch panel of the embodiment, the ground and wire electrodes are formed at mutually different locations, so that the ground electrode may be provided in a sufficient width without regard to the wire electrode when the ground electrode is formed.

That is, according to the touch panel of the embodiment, after one of the ground and wire electrodes is disposed on the printing layer, the insulating layer is disposed on the ground electrode or the wire electrode and then the remaining one of the ground electrode and the wire electrode is provided on the insulating layer, so that the ground and wire electrodes may be provided at mutually different locations.

Thus, when the ground electrode is disposed, the ground electrode may be provided in a sufficient width without regard to any widths of the wire electrode, so that the ESD shield effect is enhanced.

In addition, since the ground electrode and the insulating layer can be simultaneously formed when the sensing and bridge electrodes and the insulating material are formed by using the same materials, the processes of forming the ground electrode and the insulating layer may be omitted, so that the process efficiency can be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a cover substrate including an active area and an unactive area;
a printing layer on the unactive area;
a ground electrode on the printing layer of the unactive area;
an insulating layer over the printing layer;
a sensing electrode and a bridge electrode provided on the active area; and
a wire electrode insulated from the ground electrode by the insulating layer,
wherein the ground electrode includes:
a closed part covered with the insulating layer; and
an open part which is not covered with the insulating layer,
wherein a bottom surface of the closed part of the ground electrode contacts the printing layer,
wherein both side surfaces and a top surface of the closed part of the ground electrode are covered with the insulating layer,
wherein the sensing electrode includes a first sensing electrode and a second sensing electrode,
wherein the wire electrode includes a plurality of wire electrodes,
wherein the plurality of wire electrodes and the closed part of the ground electrode are vertically overlapped over the cover substrate,
wherein distances between bottom surfaces of the wire electrodes and a top surface of the cover substrate is greater than a distance between a bottom surface of the closed part of the ground electrode and the top surface of the cover substrate,
wherein the wire electrodes are directly connected to a top surface of the insulating layer, and a bottom surface of the insulating layer is directly connected to the ground electrode, and wherein a width of the ground electrode is greater than respective widths of the wire electrodes, wherein the ground electrode includes a material identical to a material of one of the sensing electrode or the bridge electrode, and wherein the ground electrode is formed simultaneously with the one of the sensing electrode or the bridge electrode.

2. The touch panel of claim 1, further comprising an insulating material provided on the first sensing electrode and the second sensing electrode, wherein the bridge electrode is disposed on the insulating material and is connected to at least one of the first sensing electrode or the second sensing electrode, and the insulating material includes a material identical to a material of the insulating layer.

3. The touch panel of claim 1, further comprising an insulating material disposed on the bridge electrode, wherein at least one of the first sensing electrode or the second sensing electrode is connected to the bridge electrode, and the insulating material includes a material identical to a material of the insulating layer.

4. The touch panel of claim 1, wherein:

the insulating layer is a first insulating layer, the touch panel further includes a second insulating layer, the ground electrode is directly connected to a top surface of the second insulating layer, and a bottom surface of the second insulating layer is directly connected to the printing layer.

5. The touch panel of claim 4, further comprising a protective layer on the ground electrode.

6. The touch panel of claim 4, further comprising an insulating material disposed on the first sensing electrode and the second sensing electrode, wherein the bridge electrode is formed on the insulating material and connected to at least one of the first sensing electrode and or second sensing electrode, and the insulating material includes a material identical to a material of at least one of the first insulating layer or the second insulating layer.

7. The touch panel of claim 1, further comprising a printed circuit board connected to the wire electrode, wherein the open part of the ground electrode is connected to the printed circuit board.

8. The touch panel of claim 1, further comprising a protective layer on the ground electrode, wherein the wire electrode is interposed between the printing layer and the insulating layer.

9. The touch panel of claim 8, further comprising an insulating material provided on the first sensing electrode and the second sensing electrode, wherein the bridge electrode is disposed on the insulating material and is connected to at least one of the first sensing electrode or the second sensing electrode, and the insulating material includes a material identical to a material of the insulating layer.

10. The touch panel of claim 1, further comprising a substrate on the cover substrate.

11. The touch panel of claim 10, wherein the first sensing electrode is provided on the cover substrate, and the second sensing electrode is provided on the substrate.

12. The touch panel of claim 10, wherein the wire electrode is disposed on the insulating layer.

13. The touch panel of claim 12, further comprising a protective layer on the ground electrode.

14. The touch panel of claim 10, further comprising a printed circuit board connected to the wire electrode, wherein the open part of the ground electrode is connected to the printed circuit board.

15. The touch panel of claim 1, wherein the printing layer includes a first printing layer and a second printing layer, wherein a first surface of the first printing layer is provided on one surface of the cover substrate, wherein the second printing layer is provided on a second surface of the first printing layer, wherein a width of the first printing layer is different from a width of the second printing layer.

16. The touch panel of claim 1, wherein the first sensing electrode, the second sensing electrode, and the ground electrode include at least one of chromium (Cr), nickel (Ni), copper (Cu), aluminum (Al), silver (Ag), molybdenum (Mo), or the alloy thereof.

17. The touch panel of claim 1, wherein each of the first sensing electrode and the second sensing electrode includes a mesh shape.

18. A touch device comprising the touch panel of claim 1, wherein the touch panel is disposed on a display panel, wherein the display panel includes an organic light-emitting device (OLED).

* * * * *